United States Patent [19]

Dreher et al.

[11] 3,850,661

[45] Nov. 26, 1974

[54] PROCESS FOR IMPREGNATING POROUS, INORGANIC SUBSTRATES OR ROADWAYS

[75] Inventors: Bernd Dreher, Aersh/Bl; Wolfgang Schneider, Allschwil, both of Switzerland

[73] Assignee: Ciba-Geigy AG, Basel, Switzerland

[22] Filed: Apr. 19, 1972

[21] Appl. No.: 245,647

Related U.S. Application Data

[63] Continuation of Ser. No. 59,667, July 30, 1970, abandoned.

[30] Foreign Application Priority Data

Aug. 5, 1969 Switzerland................ 11884/69

[52] U.S. Cl. .... 117/123 D, 117/161 ZB, 260/47 EN
[51] Int. Cl........................ B32b 13/12, C08g 30/14
[58] Field of Search.................. 117/123 D, 161 ZB; 260/47 EN

[56] References Cited
UNITED STATES PATENTS

| 2,906,720 | 9/1959 | Simpson et al. ............. 117/132 BE |
|---|---|---|
| 3,420,794 | 1/1969 | May et al. .................. 260/47 EN |
| 3,447,955 | 6/1969 | Wittenwyler et al. ......... 117/123 D |
| 3,491,059 | 1/1970 | Gransteidl ................. 260/47 EN |
| 3,516,847 | 6/1970 | Schuster et al. ............ 117/123 D |
| 3,567,496 | 3/1971 | Steinberg et al............. 117/123 D |
| 3,583,880 | 6/1971 | Moren et al. ............... 117/123 C |
| 3,639,317 | 2/1972 | Gagle et al................. 260/23 H |

*Primary Examiner*—William D. Martin
*Assistant Examiner*—William H. Schmidt

[57] ABSTRACT

Impregnation of porous, inorganic substrates or roadways, especially made of concrete, asbestos cement, mortar, gypsum or porous natural stone, with liquid, curable epoxide resin-curing agent mixtures consisting of (1) a liquid diglycidiyl-ether or polyglycidyl-ether or di-($\beta$-methylglycidyl)-ether or poly-($\beta$-methylglycidyl)-ether of an aliphatic diol or polyol with 2 to 12 carbon atoms, for example 1,2,6-hexanetriol-polyglycidyl-ether and (2) a cycloaliphatic or cycloaliphatic-aliphatic polyamine which is liquid at room temperature and contains at least one primary amino group, for example 3-aminomethyl-3,5,5-trimethylcyclohexylamine.

4 Claims, No Drawings

PROCESS FOR IMPREGNATING POROUS, INORGANIC SUBSTRATES OR ROADWAYS

This is a continuation, of application Ser. No. 59,667 filed July 30, 1970, now abandoned.

It is known that substrates of concrete, natural sandstone, plaster and asbestos cement are prone to erosion. Concrete road surfaces are especially prone thereto because of being subjected to salts used for thawing, to prevent the formation of ice in winter. One repeatedly finds roads in which the uppermost film mortar layer first weathers away and damage which extends deep into the concrete structure then occurs. Such damage can be itensified by too high a water/cement ratio, soaking of the fresh concrete surface or use of frost-sensitive sand. Such deep-reaching damage can, as is known, be largely prevented if sufficient artificial air pores are incorporated into the road concrete (which however results in a reduction of the mechanical strength) and/or if an impregnating layer is applied.

It has been possible to observe less damage on uphill roadways than on level stretches. It was soon found that the cause for this more favourable performance was that heavy vehicles lose more oil on travelling uphill and thereby impregnate, that is to say seal, the surface. Motor oils, diluted motor oils and diesel oils were soon thereafter sprayed onto roads to impregnate the surface. The effect was however only moderate and furthermore the grip suffered greatly. On treatment with hydrophobic substances, such as silicones, the effect also did not last long. Painting with coating materials led to smooth surfaces which presented the risk of skidding. If sand was sprinkled into the coatings, a surface layer formed which frequently flaked off in its entirety and led to high tire wear. Impregnations based on tar oils or on bituminous compositions with or without epoxide resin additives, these being polyglycidyl ethers of polyphenols and polyaminoamides as curing agents (compare U.S. Pat. No. 2,906,720), or based on sodium silicate or fluosilicates, also did not bring about any satisfactory solution of this problem.

According to investigations of the "Highway Research Roads" and of the "Bureau of Public Raods" impregnations with castor oil, cottonseed oil, soya oil or preferably with linseed oil performed very well. Linseed oil varnish has proved particularly advantageous in practice, because it resinifies rapidly and partly reacts with liberated calcium hydroxide to give water-insoluble Ca soaps.

Since road concrete as a rule shows a water/cement ratio of 0.40 to 0.45, the absorbent capillary pore space available for the impregnation is very small. Even on the road surface, where the water/cement ratio is mostly somewhat higher than in the interior, a low absorbency must be expected. In order nevertheless to permit reasonably good penetration, it has proved advisable to dilute the linseed oil varnish. Experiments with white spirit, turpentine oil and Russian turpentine have shown consistently good performance, better than all the abovementioned processes. These impregnating solutions in practice however still always show considerable disadvantages, such as above all low durability, initially smeary surface (especially if the surface is moist), high swelling capacity in water, no mechanical protective effect and long drying times (because of the oxidative curing).

It has now been found that impregnations with compositions of aliphatic polyglycidyl ethers of low viscosity and liquid cycloaliphatic polyamines as curing agents display a surprisingly high penetrating power which is significantly higher than with the impregnating solutions hitherto used in practice. Such impregnations, which are either solvent-free or contain little solvent, cure in a relatively short time to give insoluble and non-swelling products and effectively block the pores and capillary cavities of the substrate. It is also possible to apply these compositions to moist substrates without supernatant impregnating remnants being found. To increase the non-slip character, the impregnations can, after application, be sanded down with highly abrasive fillers, such as quartz powder or electrode-corundum. By adding soluble dyestuffs to the impregnating liquids, the possibility of simultaneously colouring the substrate optionally exists.

The subject of the present invention is thus a process for impregnating porous, inorganic substrates or roadways, especially made of concrete, asbestos cement, mortar, gypsum or porous natural stone, with liquid epoxide resin-curing agent mixtures, characterised in that curable liquid compositions of (1) a liquid diglycidyl-ether or polyglycidyl-ether or di-($\beta$-methylglycidyl)-ether or poly-($\beta$-methylglycidyl)-ether of an aliphatic diol or polyol with 2 to 12 carbon atoms and (2) a cycloaliphatic or cycloaliphatic-aliphatic polyamine which is liquid at room temperature and contains at least one primary amino group, are used for the impregnation.

Polyglycidyl-ethers of dihydric to hexahydric aliphatic polyalcohols with 3 to 6 carbon atoms are particularly suitable for the process. The manufacture of such polyglycidyl-ethers by single-stage or two-stage condensation of the polyalcohols with epichlorhydrin is for example described in French Pat. No. 1,097,112 and in U.S. Pat. No. 2,581,464. According to these processes, the polyglycidyl-ethers of lower glycols and glycerine can above all be manufactured in good yield and quality. These known processes are less well suited to the manufacture of the liquid glycidyl-ethers of polyhydric polyols which are solid at room temperature, where increasing difficulties arise with increasing hydroxyl equivalence and with increasing melting point. A suitable process for the manufacture of the latter products is especially the process according to Swiss Pat. No. 505,084 which describes the reaction of the polyhydroxy compound with epichlorhydrin in the presence of 1,4-dioxane.

The polyglycidyl-ethers of the polyalcohols quoted below have, together with cycloaliphatic polyamines, proved suitable as impregnating agents:

| Polyalcohol Component | Glycidyl Compound | |
|---|---|---|
| | Viscosity according to Hoeppler, 25°C | Epoxide equivalent per kg |
| 1,4-Butanediol | 16 cP | 7.9 |
| 1,4-Butenediol | 16 cP | 8.8 |
| 1,4-Butenediol | 16 cP | 10.0 |
| 1,6-Hexanediol | 9 cP | 8.4 |
| 3-Hydroxymethyl-2,4-pentanediol | 80 cP | 7.45 |
| 1,1,1-Trimethylolpropane | 82 cP | 7.2 |
| Glycerine | 910 cP | 5.6 |
| 1,2,6-Hexanetriol | 112 cP | 6.7 |
| Diglycerine | 480 cP | 6.7 |
| Pentaerythritol | 480 cP | 7.2 |
| Sorbitol | 6000 cP | 5.2 |

-Continued

| Polyalcohol Component | Glycidyl Compound | |
|---|---|---|
| | Viscosity according to Hoeppler, 25°C | Epoxide equivalent per kg |
| Dipentaerythritol | 9800 cP | 5.4 |
| Fructose | 30 cP | 5.9 |
| Sucrose | 260 cP | 5.1 |

Liquid to viscous glycidyl-ethers based on other higher-melting polyalcohols, such as dulcitol, pentoses, such as arabinose, xylose or ribose, hexoses such as glucose, mannose or gelactose and oligosaccharides such as maltose, lactose and raffinose, including their racemic mixtures and stereoisomers, are also suitable for the purposes of the invention. The cured impregnations or coatings above all show high mechanical strengths if glycidyl-ethers of poly-alcohols with more than 4 C atoms and more than 2 hydroxyl groups are used. Glycidyl-ethers with an intrinsic viscosity of above 5000 cP at 25°C should appropriately be diluted with easily volatile solvents, such as for example methyl ethyl ketone, toluene or acetone, so that the resin-curing agent mixtures show a working viscosity not exceeding 2000 cP at 25°C. The penetrating capacity can in part be increased by such diluents.

Suitable curing agent components are liquid cycloaliphatic polyamines, preferably of low viscosity, such as for example 3-aminomethyl-3,5,5-trimethylcyclohexylamine ("isophoronediamine"), bis-(3-methyl-4-aminocyclohexyl)-methane or N-cyclohexyl-1,3-diaminopropane.

Aliphatic polyamines are unsuitable because of their excessively high exothermic reaction and inadequate water resistance, as are polyaminoamides and polyaminoimidazolines because of their — in part — high intrinsic viscosity and their lower water resistance.

If desired, known accelerators for curing with amines, above all phenols, Mannich bases or heterocyclic amines, such as 2,4,6-tri-(dimethylaminomethyl)-phenol, aminoethyl-piperazine or 2,2-bis-(p-hydroxylphenyl)-propane, can be added to the impregnating solutions. Furthermore, surface-active substances can also be added to the impregnating solutions to reduce surface tension. A suitable porous inorganic substrate which can be impregnated according to the process of the invention is porous natural stone (sandstone) and above all a substrate based on inorganic, hydraulic binders, such as Portland cement, blast furnace cement, alumina cement and deep-drilling cement, or based on non-hydraulic binders, such as lime sand, gypsum, magnesia cement or clay, which are used in the form of external and internal plaster, gypsum boards, asbestos cement boards and above all concrete. The application to roadways, runways and the like made of concrete is particularly preferred.

The impregnations according to the invention after curing consolidate the uppermost layer of the substrate and show good resistance to water, salts used to cause thawing, oils and the effects of fuel.

Comparison experiments with commercially available impregnating solutions, such as linseed oil varnish, tar emulsions, silicone resins or silicone oils, polyurethane resin systems as well as epoxide resin-curing agent systems based on polyphenol-polyglycidyl-ethers, showed the distinct superiority of the impregnating systems according to the invention; as disadvantages of the known systems, the following should above all be mentioned:

| | |
|---|---|
| Linseed oil varnish | strong swellability in water; low resistance in alternating salt dipping test; no resistance to oil and petrol. |
| Tar emulsions | penetrating power too low. |
| Epoxide resin-curing agent systems based on polyphenol-polyglycidyl-ethers | no penetrating power beyond 1 mm, brittle film surface. |
| Silicone resins or silicone oils | price too high, no mechanical consolidation. |
| Polyurethane resin systems | excessive sensitivity to moisture during application. |

In the Examples which follow, parts denote parts by weight and percentages denote percentages by weight.

EXAMPLE 1

100 parts of liquid 1,2,6-hexanetriol-polyglycidylether with an epoxide content of 6.7 epoxide equivalents/kg are mixed with 42 parts of bis-(3-methyl-4-aminocyclohexyl)-methane and applied to a "B 475" concrete substrate having an average air pore volume of less than 0.5 percent.

The mixture shows a viscosity, according to Hoeppler, of 180 cP at 25°C, and a surface tension of 42.8 dyn. cm$^{-1}$. The pot life of the impregnating solution is about 8 hours at 20°C. The impregnation on concrete has cured after about 16 hours at 20°C. After curing, the impregnation is resistant to water, brine, petrol, tetralin, and crude oil, and has limited resistance to acetone and benzene. Penetration into "B 475" concrete (10 g/100 cm$^2$) can be observed up to a depth of 5 to 6 mm, according to marking with an optical brightener (0.02 percent, calculated relative to epoxide resin) and rendering visible under an ultraviolet lamp. In the frost-thaw alternating test (4 hours at + 20°C in 5 percent strength sodium chloride solution, 4 hours at − 20°C), the impregnated test specimens showed no damage of the concrete surface after 50 cycles.

EXAMPLE 2

100 parts of liquid pentaerythritol-tetrapolyglycidylether with an epoxide content of 7.2 epoxide equivalents/kg are mixed with 4 parts of bis-(3-methyl-4-aminocyclohexyl)-methane and applied to "B 475" concrete in accordance with Example 1. The mixture has a viscosity, according to Hoeppler, of 300 cP at 25°C and a surface tension of 43 dyn. cm$^{-1}$. The pot life is about 16 hours at 20°C; the curing of the impregnation on concrete takes about 10 hours. The finished impregnation is resistant to water and to brine, crude oil, acetone, ethyl acetate, ethylene glycol monoethyl ether, ethylglycol, ethanol, benzene, petrol, tetralin and trichlorethylene. The depth of penetration is 5 to 7 mm, and the frost-thaw alternating test shows no attack of the concrete surface after 50 cycles.

EXAMPLE 3

100 parts of liquid fructose-polyglycidyl-ether with an epoxide content of 5.9 epoxide equivalents/kg are mixed with 37 parts of bis-(3-methyl-4-aminocyclohexyl)-methane and applied to "B 475" concrete in accordance with Example 1. The mixture shows a viscosity of 194 cP at 25°C, a surface tension of 43.5 dyn. cm$^{-1}$ and a pot life of about 8 hours at 20°C. The curing of the impregnated layer is complete after 25 hours at 20°C. The depth of penetration is about 6 mm.

EXAMPLE 4

100 parts of the liquid 1,2,6-hexanetriol-polyglycidyl-ether used in Example 2 are mixed with 31 parts of 3aminomethyl-3,5,5-trimethylcyclohexylamine and applied to concrete in accordance with Example 1. This mixture shows a viscosity of 90 cP at 25°C, a surface tension of 37.8 dyn. cm$^{-1}$ and a pot life of 85 minutes at 20°C; the curing of the impregnated layer takes about 10 hours. The depth of penetration in concrete is about 3 mm. The impregnation has good resistance to water and fuels.

EXAMPLE 5

100 parts of the liquid 1,2,6-hexanetriol-polyglycidyl-ether used in Example 1 are mixed with 37 parts of N-cyclohexyl-1,3-diaminopropane and applied to concrete in accordance with Example 1. This mixture shows a viscosity of 56 cP at 25°C, a surface tension of 39.3 dyn. cm$^{-1}$ and a pot life of 88 minutes at 20°C; the curing of the impregnated layer takes about 30 hours. The depth of penetration in concrete is about 3 mm. The resistance of the impregnation, especially to fuels, is good.

EXAMPLE 6

100 parts of the liquid 1,2,6-hexanetriol-polyglycidyl-ether used in Example 1 are mixed with 28 parts of bis-(3-methyl-4-aminocyclohexyl)-methane and 6 parts of 2,4,6-tris-(dimethylaminomethyl)-phenol in accordance with Example 1 and applied to concrete.

This mixture shows a viscosity of 100 cP at 25°C, a surface tension of 42.2 dyn. cm$^{-1}$ and a pot life of 90 minutes; the curing time of the impregnated layer is 6 hours. The depth of penetration in concrete is about 3 mm. The resistance of the impregnation almost corresponds to that of Example 1.

COMPARISON EXPERIMENT

For comparison, coatings on concrete were effected with two different epoxide resin-curing agent systems based on a liquid polyphenol-polyglycidyl-ether resin (a technical product, mainly consisting of bisphenol-A-diglycidyl-ether, having the following characteristics: epoxide content 5.1 - 5.35 epoxide equivalents/kg; viscosity according to Hoeppler at 25°C: 8000 – 12,000 cP; Gardner colour number: maximally 3), an active diluent (cresylglycidyl-ether) and a liquid aliphatic polyamine or a liquid, cycloaliphatic polyamine.

For both comparison samples 1 and 2, a resin mixture of 55 parts of liquid bisphenol-A-diglycidyl-ether resin and of 45 parts of cresyl-glycidyl-ether was employed. The resin mixture had a viscosity, according to Hoeppler, of 110 cP at 25°C.

For comparison sample 1, 100 parts of liquid resin mixture were mixed with 35 parts of bis-(3-methyl-4-aminocyclohexyl)-methane. The impregnating solution had a viscosity of 130 cP at 25°C and a surface tension of 44 dyn. cm$^{-1}$. On application to concrete, the depth of penetration was only about 0.1 mm. A supernatant, very brittle coating resulted.

For comparison sample 2, 100 parts of liquid resin mixture were mixed with 12 parts of triethylene-tetramine. The impregnating solution had a viscosity of 110 cP at 25°C and a surface tension of 42 dyn. cm$^{-1}$. On application to concrete, the depth of penetration was again only about 0.1 mm and a supernatant coating again resulted.

We claim:

1. In a process for impregnating porous, inorganic substrates for roadways with curable liquid epoxide resincuring agent composition, the improvement which consists in using as the curable, liquid composition a mixture consisting essentially of (1) a liquid polyglycidyl-ether containing at least two glycidyl groups or poly-($\beta$-methylglycidyl)-ether containing at least two $\beta$-methylglycidyl groups said polyglycidyl ether or poly-$\beta$-methylglycidyl)ether being derived from an aliphatic polyol containing at least 2 hydroxyl groups and 2 to 12 carbon atoms; and (2) a cycloaliphatic or cycloaliphatic-aliphatic polyamine which is liquid at room temperature and contains at least one primary amino group.

2. A process according to claim 1, wherein a solvent-free composition having a viscosity not exceeding 2000 cP at 25°C is used.

3. A process according to claim 1, wherein a composition of which the viscosity has been adjusted to not more than 2000 cP at 25°C by adding a volatile, organic solvent is used.

4. A process according to claim 1, wherein the curable composition contains in addition a surface-active agent for lowering its surface tension.

* * * * *